United States Patent [19]
Collie

[11] 3,955,554
[45] May 11, 1976

[54] SOLAR HEATING SYSTEM
[76] Inventor: Robert L. Collie, 2507 Catalina Drive, Orlando, Fla. 32805
[22] Filed: Apr. 29, 1974
[21] Appl. No.: 465,089

[52] U.S. Cl. .............................. 126/270; 126/400; 34/93; 165/107
[51] Int. Cl.² .......................................... F24J 3/02
[58] Field of Search ............... 34/93; 126/263, 270, 126/271, 400; 165/107; 237/1 A

[56] References Cited
UNITED STATES PATENTS

| | | | |
|---|---|---|---|
| 1,678,711 | 7/1928 | Shipman | 34/93 X |
| 2,497,612 | 2/1950 | Katzman | 126/263 X |
| 2,566,327 | 9/1951 | Hallock | 34/93 |
| 2,856,506 | 10/1958 | Telkes | 126/263 X |
| 2,933,885 | 4/1960 | Benedek et al. | 126/400 X |
| 3,369,541 | 2/1968 | Thomason | 126/400 |

Primary Examiner—John J. Camby
Assistant Examiner—Henry C. Yuen
Attorney, Agent, or Firm—Duckworth, Hobby & Allen

[57] ABSTRACT

A solar heating method and apparatus including a system for storing solar heat is provided for heating a house, building or other area. A chamber is filled with calcium oxide which is fed on demand to a tank of water where it converts to calcium hydroxide releasing energy which heats the water. Heat from the water is removed through a heat exchanger for heating a building, or the like, and the calcium hydroxide is dewatered utilizing a solar heater which converts the calcium hydroxide back to calcium oxide. The calcium oxide is transferred back into the calcium oxide storage container.

11 Claims, 1 Drawing Figure

U.S. Patent  May 11, 1976  3,955,554
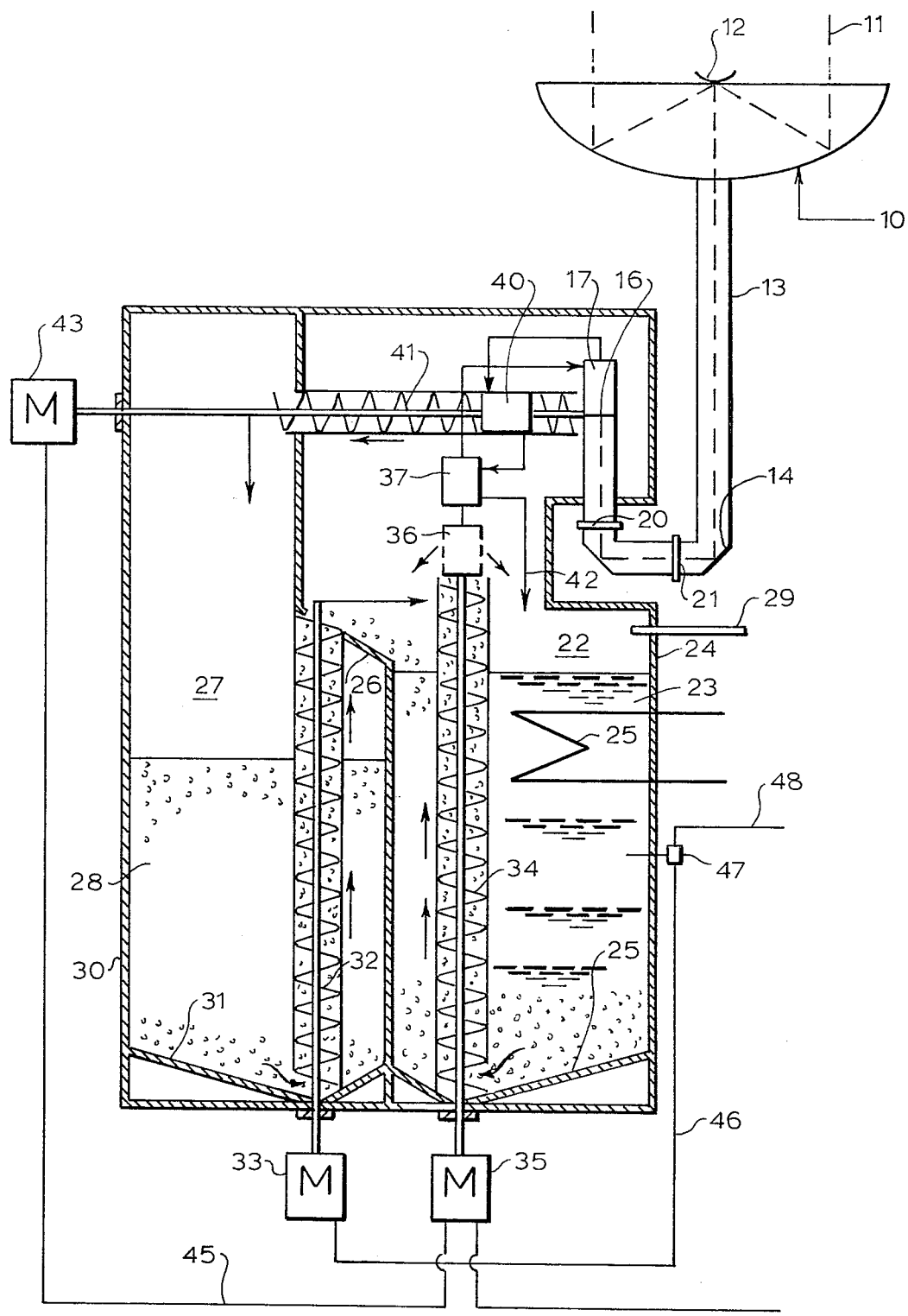

SOLAR HEATING SYSTEM

BACKGROUND OF THE INVENTION

The present invention relates to solar heating systems and means of storing heat for use at a later time.

In the past there have been a great many solar heating systems including the utilization of lens or parabolic dishes for directing solar energy against a heat-absorbing surface which is used to heat water or other materials for transfer to a building to be heated.

Solar heating is also accomplished by placing thin rectangular or square containers having copper water pipe passing in a serpentine fashion over the bottom thereof on the roof of a building. The bottom of the containers can be painted black and a glass cover can be placed over the tubes and the container filled with water, if desired, so that the sunlight hitting the roof will pass through the glass and be impinged upon the black surface which absorbs the heat and heats the water. The copper pipe acts as a heat exchanger for the system to transfer back into a building for heating the building or the hot water used in the building. Similar systems have also been utilized for heating swimming pools to increase the temperature of the water in the pool. A major problem with solar heaters has been the storage of the energy or use at a later time. The system may be very effective during sunlight, but loses its effectiveness on cloudy or rainy days and during the night time. In order to store the heat for evening use it has been suggested to place large tanks in the ground and have the heated water from the solar heater fed into the tanks to heat the water in the tanks underground which is stored and utilized to heat the house in the evenings. Similar storage systems have utilized earth which has been wet, as well as sand, stones, bricks, and the like, which are heated by the solar heating system. A heat exchanger removes the heat from the stored heat in the heated rocks, gravel, or the like, for transfer into the building in the evenings. These systems lose their desirability because of their short term storage and because they have little effect during any lengthy period of cloudy or rainy weather. This is especially true of those areas which have a considerable number of cloudy, rainy days during the year, especially during the winter time when the heat is most desirable, but when the daytime hours are shortest.

The present invention overcomes some of the disadvantages of the prior art by providing for long term storage of the solar energy which can then be utilized at any time desired.

SUMMARY OF THE INVENTION

The present invention relates to a solar heating system in which a liquid storage chamber stores water and a dry chemical storage container stores calcium oxide (CaO). Calcium oxide which is in powdered or granular form, is transferred by an auger conveyor, or the like, into the liquid container upon actuation of the conveyor. The calcium oxide is converted to calcium hydroxide (Ca(OH$_2$) when it is dropped into the liquid, releasing heat and heating the water in the liquid container. The heat exchanger placed in the liquid container is utilized to transfer the heat from the liquid container to a building, or the like. The calcium hydroxide is converted to calcium oxide by straining the water out and feeding it through a solar heater which removes the water and converts the calcium hydroxide back into calcium oxide where it is placed back into the calcium oxide storage container. Motor driven augers are used to transfer material and thermostats may be utilized to actuate the apparatus.

A method is provided including the steps of transferring the calcium oxide into water held in a tank and removing the heat generated in the water therefrom. Removing the calcium hydroxide from the water and converting it to calcium oxide, including heating with a solar heater and transferring the calcium oxide to a storage container, completes the method.

BRIEF DESCRIPTION OF THE DRAWING

Other objects, features and advantages of this invention will be apparent from a study of the written description and the drawing, in which the FIGURE is a sectional and diagramatic view of a system in accordance with the present invention.

DESCRIPTION OF THE PREFERRED EMBODIMENTS

Referring now to the FIGURE, a solar heating parabolic mirror 10 is illustrated reflecting sunlight 11 onto a center mirror 12 which directs the sunlight into a light tunnel 13 off of a reflecting surface 14 onto a reflecting surface 15 and against a black surface 16 where the energy is absorbed into the solar heating chamber 17. The light channel 13 has a rotatable ring connection 20 and 21 to provide for dual rotation of the parabolic mirror 10 to direct the parabolic mirror towards the sun at different times of the day and year. It should of course be clear that other types of solar heaters can be used equally as well, including various types of lens and reflecting surfaces for generating the heat in the solar heating chamber 17. A chamber 22 is partly filled with water 23 and has walls 24 with a heat exchanger 25 passing through the walls 24 to the exterior thereof so that heat in the water 23 can be transferred from the chamber 22 through the heat exchanger 25 to heat a building. Chamber 22 has angled bottom surfaces 25 and an angled chute 26 for feeding material from a chamber 27 thereinto. Chamber 27 is filled with a chemical 28 which may be calcium oxide in the preferred embodiment. Chamber 27 has walls 30 and an angled bottom 31 so that the calcium oxide 28 can be fed through an auger 32 driven by a motor 33 up onto the chute 26 where it is dumped into the water 23 in chamber 22. The calcium oxide 28 is converted to calcium hydroxide in the water 22 releasing heat in the following equation:

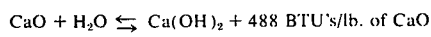

$$CaO + H_2O \leftrightarrows Ca(OH)_2 + 488 \text{ BTU's/lb. of CaO}$$

CaO is commonly referred to as quicklime and is a relatively inexpensive substance which produces heat energy by the formation of the hydrate and can be reconverted to calcium oxide by removing the water in the reversible equation. If the hydrated lime is heated to redness, the CaO will be regenerated to reverse the reaction. One pound of water combines wih approximately 3 1/9 pounds of calcium oxide to give calcium hydroxide plus 1618 BTU's of energy. To reverse the equation requires the same amount of energy. The calcium hydroxide in chamber 22 settled to the bottom where the angled surface 25 directs it into an auger 34 driven by electric motor 35 which raises it to a screened container 36 which allows excess water to drain from the slurry as the material is fed up the auger 34. The auger 34 then feeds the slurry into a preheating chamber 37 where it is preheated prior to being fed into the solar heating chamber 17. The solar heating chamber 17 concentrates energy from the sun along the surface 16 which gets very hot driving the moisture from the calcium hydroxide and reversing the equation by converting the calcium hydroxide to calcium oxide. The excess steam and water driven off is fed first to a heater/cooler 40, where the calcium oxide is being fed from the solar heater 17 by means of an auger 41 back into the container 27. The calcium oxide is cooled but the steam and water are further heated in after heater/cooler 40, with the steam passing into the preheater 37 where the steam is converted to heated water which is fed as shown by line 42 back into the container 122. Auger 41 is driven by a motor 43. It will of course be clear that while augers or screws have been used as a convenient method for transferring the material, other conveyor systems could be used without departing from the spirit and scope of the invention.

Motor 35 is connected by electrical conductor 45 to motor 43 inasmuch as when motor 35 is operated, motor 43 would also be operated to provide continuous movement of the material to the solar heater and from the solar heater into the container 27. Motor 33 is shown connected by line 46 to a thermostat 47 and by line 48 to a switch. Thus, the motors 33 and 43 would be actuated only when heat was required in the water 23 in chamber 22 and could be manually operated by a switch at the end of line 48 or actuated in accordance with a thermostat as desired. Similarly, a thermostat located in a building could actuate the system to heat the building by moving fluid through the heat exchanger 25 to transfer heat. A delay to allow the heat to build up in the container 22 could be controlled by thermostat 47 indicating that the water 23 contained sufficient heat for operation prior to pumping fluid through the heat exchanger 25.

The method of operation provides for transferring calcium oxide (CaO) 28 from container 27 onto the chute 26 and into the container 22 water 23 where the water is heated. Heat is transferred from the water 23 through the heat exchanger 25 and out of the system. Calcium hydroxide formed from the calcium oxide in water is fed by an auger 34 where it has water drained therefrom in the screened chamber and is fed into a solar heated chamber 17. The calcium hydroxide is heated in the solar heated chamber by solar energy to convert the calcium hydroxide into calcium oxide and to transfer or direct the calcium oxide back into the storage container.

It should of course be clear at this point that a solar heating system and heat storage system for use in a solar heating system has been provided. However, other suitable storage chemicals could be utilized and the heat generated can also be used in an absorption air conditioning system without departing from the spirit and scope of the invention. Accordingly, this invention is not to be construed as limited to the particular forms disclosed herein since these are to be regarded as illustrative rather than restrictive.

I claim:
1. A heating apparatus comprising in combination:
  a. liquid storage chamber for storage of a liquid;
  b. dry chemical storage chamber for storage of a chemical which generates heat when mixed with said liquid in said liquid storage chamber;
  c. conveyor means connecting said dry chemical storage to said liquid storage chamber including means to transfer said dry chemical from said dry chemical storage chamber into said liquid storage chamber when actuated;
  d. heat exchange means located in said liquid storage chamber and operatively connected to transfer heat from said liquid in said chamber to the exterior of said liquid storage chamber;
  e. means for removing dry chemical transferred to said liquid storage chamber
  f. solar heating means for drying said chemical being removed from said liquid storage chamber with a solar heater; and
  g. means for transferring said dry chemical back into said dry chemical storage chamber whereby a heating system may have prolonged storage of heat.

2. The apparatus in accordance with claim 1 in which said conveyor means connecting said dry chemical storage to said liquid storage chamber is an auger feeding dry chemicals to an angled chute directing dry chemicals into liquid storage chamber.

3. The apparatus in accordance with claim 1 in which said dry chemical is calcium oxide and said liquid stored in said liquid storage chamber is water.

4. The apparatus in accordance with claim 2 in which said means for removing dry chemical from said liquid storage chamber includes at least one auger and a screened chamber for draining excess water from said dry chemical.

5. The apparatus in accordance with claim 1 in which said solar heater contains means for concentrating and directing sunlight against a heating surface for heating a solar heating chamber.

6. The apparatus in accordance with claim 3 in which said liquid storage chamber has a thermostat extending thereinto for measuring the temperature of the water therein and actuating a switch if the temperature in said water is below a predetermined level.

7. The apparatus in accordance with claim 6 in which said liquid storage chamber and said dry chemical storage chamber each have angled bottom surfaces for directing material to said augers.

8. The apparatus in accordance with claim 1 in which a preheater preheats said dry chemical and liquid being fed from said liquid storage chamber to said solar heater, said preheater being operatively connected to said solar heater for receiving steam generated by said solar heater.

9. A solar heating method comprising the steps of
  a. transferring calcium oxide into a tank of water to convert said calcium oxide to calcium hydroxide thereby releasing heat;
  b. removing heat from said water tank;
  c. converting calcium hydroxide to calcium oxide including the step of removing excess moisture from the calcium hydroxide and heating said calcium hydroxide in a solar heating chamber; and
  d. transferring said calcium oxide to a storage chamber whereby solar energy may be stored for extended periods of time.

10. The method in accordance with claim 9 including the step of preheating said calcium hydroxide following the removing of excess moisture therefrom.

11. The method in accordance with claim 10 including the step of cooling the calcium oxide which has been converted from calcium hydroxide following the heating of the calcium hydroxide with solar heat with the steam generated in the solar heater.

* * * * *